United States Patent Office 3,526,741
Patented Sept. 1, 1970

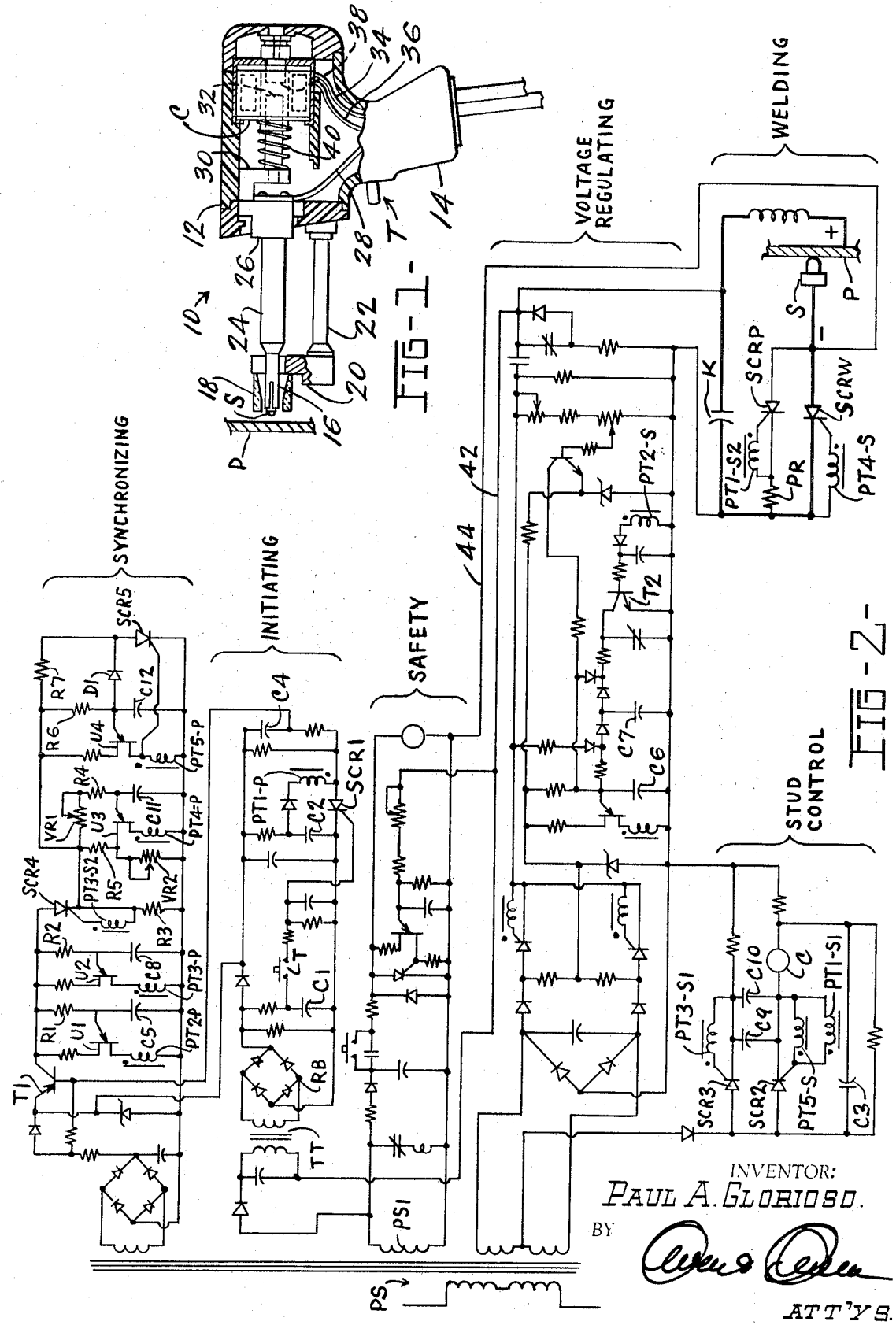

3,526,741
METHOD AND APPARATUS FOR WELDING STUDS
Paul A. Glorioso, Amherst, Ohio, assignor, by mesne assignments, to TRW Inc., Cleveland, Ohio, a corporation of Ohio
Filed Dec. 7, 1966, Ser. No. 599,950
Int. Cl. B23k 9/00
U.S. Cl. 219—98                                   8 Claims

ABSTRACT OF THE DISCLOSURE

A stud welding tool is provided with means for automatically stripping the chuck of the tool from the welded stud. In welding studs to a workpiece, the studs are frictionally held in a chuck of the tool and after the stud is welded, the tool must be physically withdrawn to pull the chuck off the stud. While the physical effort required is not large, over a period of time, particularly when a large number of studs are continuously being welded, the effort has a noticeably tiring effect on the operator. In the new welding tool, the lifting coil of the tool is energized automatically again, after the stud is welded, to cause the chuck to retract again and strip itself from the stud while the tool is held stationary by the operator. The operator can then simply remove the tool with no extra physical effort at all.

---

This invention relates to stud welding and particularly to stud welding in which the chuck of the welding tool is automatically separated from the welded stud at the end of the welding cycle.

In the conventional stud welding operation, a stud is placed in a chuck of a stud welding tool and held against the workpiece to which the stud is to be welded, with a spark shield or ferrule surrounding the stud and maintaining the welding tool in a fixed position relative to the workpiece during the weld. When the tool is operated, the chuck retracts to separate the weldable end of the stud a predetermined distance from the workpiece with a pilot arc simultaneously being drawn between the stud end and the workpiece. The chuck is subsequently moved toward the workpiece again to plunge the stud against the workpiece after a main welding arc is established between the stud and the workpiece. The main welding arc is usually initiated after the plunge begins with the welding arc maintained until the stud comes into physical contact with the workpiece. The operator then moves the tool away from the workpiece to pull the chuck off the now-welded stud. The welding tool is next moved to a new location for another weld.

The effort required on behalf of the operator to remove the tool and specifically the chuck from the welded stud is not great. However, with studs now commonly welded at rates up to fifty-sixty per minute, this effort can become quite significant and tire the operator over a period of time. The necessity of pulling the tool off the stud also slows down the welding operation slightly, which again can be significant when many studs are welded per unit of time.

In accordance with the present invention, the chuck of the welding tool is automatically retracted a second time, after the weld is complete, to automatically pull the chuck off the stud without any effort at all required on behalf of the operator. When the stud retracts the second time, the separating force is applied through the spark shield against the workpiece so that the body of the welding tool does not move during the separation of the chuck from the stud. The operator can then locate the tool at another location for the next welding cycle without effort, other than that required to move and manipulate the tool.

It is, therefore, a principal object of the invention to provide a method and apparatus for automatically separating a chuck of a welding tool from a stud after the weld is completed.

Another object of the invention is to provide a method and apparatus for welding studs which requires less effort on behalf of the operator and which enables more studs to be welded per unit of time.

Other objects and advantages of the invention will be apparent from the following detailed description of a preferred embodiment thereof, reference being made to the accompanying drawings, in which:

FIG. 1 is a somewhat schematic view in longitudinal cross section of a stud welding tool with which the invention can be employed; and FIG. 2 is a diagrammatic view of circuitry embodying the invention.

Referring to FIG. 1, a stud welding tool with which the invention can be employed is indicated at 10 and can be of a known design, requiring no special components to enable the practice of the present invention. The tool 10 includes a main housing or body 12 of suitable dielectric material having a handle 14 depending therefrom. A chuck 16 is located at the forward end of the tool and has a plurality of fingers which receive and resiliently hold a stud S when being welded to a workpiece P. The fingers of the chuck 16 apply sufficient pressure on the stud to securely hold it during the welding operation yet enable the chuck and the tool to be withdrawn from the stud when the stud is welded, without great effort being required. However, when the studs are welded at high rates, even the relatively small effort required to remove the chuck from the stud can become quite significant. For high rates of welding, the studs can be fed to the chuck from the rear by a feeding system such as that shown in a U.S. patent application to Spisak, Ser. No. 358,736.

A suitable spark shield 18 is located around the chuck 16 and the stud S. The shield is positioned so that the end of the stud protrudes slightly beyond the shield prior to the stud being pressed against the workpiece. This assures that the stud is initially in good electrical contact with the workpiece, when the spark shield is placed thereagainst, prior to welding. The spark shield 18 is held in the desired position by a supporting foot 20 which, in turn, is supported from the front end of the body 12 by a pair of adjustable legs 22 which can be moved somewhat into or out of the body 12 to adjust the end of the spark shield 18 relative to the end of the stud S. Rather than a permanent spark shield, a temporary or disposable spark shield can be employed, such a shield being better known as a ferrule. The ferrule can be held in the desired position the same as the permanent spark shield by means of a slightly modified supporting foot, as is known in the art. Even if no spark protection were necessary, the shield, ferrule, or other means would be important to maintain the welding tool in fixed relation with respect to the workpiece during the welding operation.

The stud chuck 16 is attached to a chuck leg 24 which is electrically connected by a cable clamp 26 to a main welding cable 28. A rear cable clamp part 30 has a solenoid core 32 extending rearwardly therefrom into a lifting and holding coil designated C. The core is pulled into the coil C when power is applied thereto through suitable leads 34 and 36. An adjustable stop 38 at the rear of the coil C determines the extent to which the core moves into the coil and, hence, the extent to which the stud is retracted from the workpiece during the welding cycle. After current to the coil C has been shut off, a return or plunge spring 40 moves the chuck 16 back toward the workpiece and plunges the stud against the workpiece after a main welding arc has been established therebetween.

In the operation of the tool, the weldable end of the stud S is placed in contact with the workpiece and pressed thereagainst, compressing the spring 40 slightly, until the end of the spark shield 18 contacts the workpiece P. When the trigger is pulled, the coil C is energized and the stud S is withdrawn a predetermined distance from the workpiece by the retraction of the core 32. At the same time, a potential is established between the stud S and the workpiece P so that a pilot arc is drawn between the two as the stud is retracted. After a period of time, the current to the coil C is shut off, enabling the plunge spring 40 to move the chuck 16 back toward the workpiece and cause the weldable end of the stud S to contact the workpiece. Before the engagement of the stud and the workpiece, a main welding arc is established therebetween. The main welding arc preferably is maintained until the stud actually plunges against the workpiece to assure that metal melted by the main welding arc will not solidify prior to the contact.

In accordance with the invention, the coil C is energized a second time, after the weld is complete, which again retracts the chuck 16 but, since the stud S is now welded to the workpiece, results in the separation of the chuck from the stud. The spark shield 18 still remains against the workpiece P at this time so that it is impossible for the tool to move toward the workpiece when the chuck 16 is retracted, with the result that the chuck must be pulled from the stud. The chuck 16 is retracted only momentarily but will not grasp the stud again when the coil is de-energized and the chuck is moved toward the workpiece, even though the tool remains in position. This is because of the nature of the resilient fingers of the chuck which are designed so that the chuck cannot easily accidentally grasp the stud from the front, especially when of the type to which studs are supplied from the rear. Consequently, when the chuck moves forwardly for the second time, it contacts but does not grasp the head of the stud. Therefore, the chuck does not move fully to its forward or extended position until the tool is removed, with the plunge spring 40 being slightly compressed until then. The spring thus actually aids in subsequently removing the tool as it is moved back from the stud by the operator.

A specific circuit for carrying out the invention is shown in FIG. 2. Much of this circuitry is described in detail in my co-pending application Ser. No. 498,802 entitled "Welding Studs to Workpieces" and will not be discussed in detail here, especially since such details do not form a part of the instant invention. When the stud S is in contact with the workpiece P, an electrical path is completed through lines 42 and 44 which connect a secondary winding PS1 of a main power source PS to a tuned transformer TT. A full wave rectifier bridge RB then establishes a source of fully rectified current for an initiating portion of the circuitry. When contacts of a trigger T of the tool 10 are closed, a capacitor C1 is connected to the gate of and fires or keys a first silicon controlled rectifier SCR1. This enables a capacitor C2 to discharge through a primary PT1–P of a first pulse transformer.

Energization of the primary PT1–P causes a pilot arc to be established between the stud S and the workpiece P as the stud is retracted from the workpiece. For this purpose, a second silicon controlled rectifier SCR2 in the stud control portion of the circuit is keyed by a secondary PT1–S1 of the first pulse transformer. This silicon controlled rectifier is in series with the lifting coil C and, when keyed, enables a capacitor C3 to discharge partially across the coil C to pull in the core 32 and retract the stud from the workpiece.

Another secondary winding PT1–S2 of the first pulse transformer is located in the welding portion of the circuitry and is pulsed simultaneously with the first secondary winding. Pulsing of the second secondary winding keys a silicon controlled rectifier SCRP which establishes a pilot arc circuit between the stud and workpiece and a main welding capacitor K, which constitutes a primary welding power source. This pilot arc circuit is established through a pilot arc resistor PR which limits the power for and the intensity of the pilot arc. Hence, through the two secondaries PT1–S1 and PT1–S2, the first pulse transformer causes the stud to retract and the pilot arc to be drawn.

At the time the rectifier SCR1 was keyed, a transistor T1 in the synchronizing portion of the circuit was turned on or energized after a time delay determined by a capacitor C4 in the initiating portion of the circuit. With the transistor T1 turned on, a capacitor C5 is charged, with the rate of charging being determined by a fixed resistor R1. The capacitor C5 fires a first unijunction transistor U1, when the stand-off ratio is exceeded, and discharges through a primary PT2–P of a second pulse transformer. This pulse transformer isolates the voltage regulating circuit from the welding capacitor K, the two having been previously connected when the power source was rendered operative. The isolation is accomplished through a secondary PT2–S in the voltage regulating circuitry which energizes a transistor T2 and discharges capacitors C6 and C7.

A primary PT3–P of a third pulse transformer in the synchronizing circuit is pulsed after the power source is isolated from the capacitor K. A capacitor C8 begins to charge through a resistor R2 at the same time that the capacitor C5 begins to charge, but at a slower rate. When the capacitor C8 reaches a predetermined charge, it keys a second unijunction transistor U2 and discharges across the primary winding PT3–P. The third pulse transformer has a first secondary PT3–S1 in the stud control portion of the circuitry which keys a third silicon controlled rectifier SCR3. The keying of this rectifier enables capacitors C9 and C10 to be connected back across the rectifier SCR2 and cause it to turn off. This de-energizes the lifting coil C so that the stud S begins to plunge toward the workpiece P under the influence of the return or plunge spring 40.

The third pulse transformer has a second secondary winding PT3–S2 in another portion of the synchronizing circuit which causes another portion of the synchronizing circuit to be operative. The pulse of this secondary keys a fourth silicon controlled rectifier SCR4 which is then held in through a resistor R3. A capacitor C11 begins to charge at a rate determined by a resistor R4 and a variable resistor VR1. When the capacitor reaches a predetermined charge, a third unijunction transistor U3 is keyed to pulse a primary PT4–P of a fourth pulse transformer. A secondary PT4–S of this transformer is located in the main welding circuit and, when pulsed, fires a silicon controlled rectifier SCRW which controls the main welding current. The capacitor K is thereby connected across the stud and the workpiece to initiate the main welding arc between the two.

A variable resistor VR2 and a biasing resistor R5 across the primary PT4–P serve to calibrate and control the firing voltage of the unijunction transistor U3, with both variable resistors VR1 and VR2 being effective to adjust the timing of the main welding arc. When the capacitor K is discharged and the stud has contacted the workpiece P, the weld is completed.

In accordance with a specific embodiment of the invention, the synchronizing portion of the circuit further includes means for enabling the welding tool coil C to be energized a second time, after the stud is welded to the workpiece. Accordingly, when the rectifier SCR4 is keyed, a capacitor C12 also charges at a rate determined by a resistor R6. When the capacitor C12 reaches a predetermined charge, it energizes a unijunction transistor U4, pulsing a primary winding PT5–P of a fifth pulse transformer which pulses a secondary PT5–S in the stud control circuit, in parallel with the first secondary PT1–S1 of the first pulse transformer. The secondary PT5–S then keys the rectifier SCR2 and again enables the capacitor C3 to discharge through the coil C and retract the chuck 16. With the stud S now welded to the workpiece P, however, the stud remains stationary while the chuck 16 is separated therefrom. The spark shield 18 remains against the workpiece P during this time to provide a support on which the retracting force can react when the chuck is stripped from the stud.

The chuck will retract only until the rectifier SCR3 is keyed again, which occurs periodically, since the capacitor C8 in the synchronizing circuit continually charges and discharges and thus periodically pulses the primary PT3–P. Ordinarily, the repetitive pulsing of this pulse transformer has no effect, since the lifting coil is ordinarily energized but once. However, with the multiple energization of the coil, the periodic pulsing of the transformer PT3 can be utilized to de-energize the coil the second time.

When the unijunction transistor U4 is keyed, a silicon controlled rectifier SCR5 also is keyed by the capacitor C12. This prevents the capacitor C12 from charging again through the resistor R6, and a diode D1 prevents the capacitor C12 from charging through a resistor R7, which provides a load for the rectifier SCR5.

The capacitors C8, C11, and C12 are sized so as to provide the proper sequencing of the pulse transformers and the coil. The capacitor C12 must pulse the fifth transformer after the coil C is de-energized the first time and after the main welding arc has terminated, as determined by the capacitor C11, while the capacitor C8 must discharge a second time and pulse the transformer secondary PT3–S1 the second time after discharge of the capacitor C12.

With the automatic stripping of the stud, the fatigue of the operator is substantially decreased and, further, welds can be made more rapidly over a given period of time with less fatigue resulting.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. In apparatus for welding a stud to a workpiece which comprises a chuck for holding a stud while being welded to the workpiece, a spark shield around the chuck and positioned to be maintained in contact with the workpiece during the weld, means for retracting the chuck to space the stud a distance from the workpiece, means for drawing a pilot arc between the stud and the workpiece, means for moving the chuck back toward the workpiece to cause the stud to contact the workpiece, and means for establishing a main welding arc between the stud and the workpiece prior to the stud contacting the workpiece, the improvement comprising means for retracting the chuck a second time, after the stud has been welded to the workpiece, a distance sufficient to separate the chuck from the stud, while maintaining the spark shield in contact with the workpiece, and means for moving the chuck back toward the workpiece a second time to place the chuck in a welding position to receive another stud.

2. A method of welding a stud to a workpiece which comprises frictionally holding the stud in a chuck of a welding tool with the weldable end of the stud in electrical contact with the workpiece, and with a spark shield in contact with the workpiece around the stud, retracting the chuck from the workpiece to space the weldable end of the stud from the workpiece by energizing an electrical coil having a core to which the chuck is connected, drawing a pilot arc between the weldable end of the stud and the workpiece, moving the chuck toward the workpiece after de-energizing the electrical coil, establishing a main welding arc between the stud and the workpiece before the stud contacts the workpiece, withdrawing the chuck away from the workpiece a second time, after the stud has been welded to the workpiece, without moving the welding tool or the spark shield, a sufficient distance to separate the chuck from the stud by energizing the electrical coil a second time, and subsequently moving the chuck back toward the workpiece a second time.

3. Apparatus for welding a stud to a workpiece, said apparatus comprising a welding tool having a chuck for holding a stud while being welded to the workpiece, an electrical coil, a core, means connecting said core and said chuck whereby when said core is pulled into said coil when said coil is energized, said chuck is retracted to space the stud a distance from the workpiece, resilient means for moving the chuck back toward the workpiece to cause the stud to contact the workpiece when the coil is de-energized, means for establishing a main welding arc between the stud and the workpiece prior to the stud contacting the workpiece, means for energizing said coil a second time, after the stud has been welded to the workpiece, to move said chuck a sufficient distance away from the workpiece to separate the chuck from the stud without moving the welding tool, and means for de-energizing said coil a second time to enable said resilient means to move the chuck back toward the workpiece a second time.

4. Apparatus according to claim 3 characterized by said means for energizing said coil a second time comprises time delay circuit means energized during the weld cycle, switch means electrically associated with said coil, and responsive means responsive to said time delay circuit means for closing said switch means to energize said coil the second time, after a determinable period of time has elapsed.

5. Apparatus according to claim 4 characterized further by said time delay circuit means including a primary of a pulse transformer which is energized after the determinable period and said responsive circuit means includes a secondary of the pulse transformer energized when said primary is energized to close said switch means.

6. Apparatus according to claim 4 characterized further by said switch means including a semiconductor controlled rectifier which is keyed by said responsive means.

7. In apparatus for welding a stud to a workpiece which comprises a welding tool, a chuck for frictionally holding a stud while being welded to the workpiece, a spark shield around the chuck and positioned to be maintained in contact with the workpiece during the welding operation, means extending from said tool for supporting said spark shield in the position, electrically energized means in said welding tool for retracting the chuck to space the stud a distance from the workpiece, circuit means for supplying electrical energy to said retracting means, means for supplying power to the stud substantially simultaneously with the energization of said retracting means for drawing a pilot arc between the stud and the workpiece as the stud is retracted, means for moving the chuck back toward the workpiece to cause the stud to contact the workpiece when said electrically energized means is first de-energized, means for establishing a main welding arc on the pilot arc between the stud and the workpiece prior to the stud contacting the workpiece, and additional circuit means associated with said circuit means for supplying electrical energy to said retracting means a second time, after the stud has been welded to the workpiece, to retract said chuck a distance sufficient to separate the chuck from the stud, while maintaining the tool stationary and the spark shield substantially in contact with the workpiece.

8. Apparatus according to claim 7 characterized further by means for automatically moving said chuck back toward the workpiece a second time.

References Cited

UNITED STATES PATENTS

| | | | |
|---|---|---|---|
| 2,847,557 | 8/1958 | English | 219—98 |
| 3,171,011 | 2/1965 | English | 219—98 |
| 3,247,501 | 4/1966 | Riley | 219—114 |
| 3,352,996 | 11/1967 | Neumeier | 219—98 |
| 2,763,755 | 9/1956 | Graham | 219—98 |
| 3,073,947 | 1/1963 | Mortensen et al. | 219—98 |
| 3,250,891 | 5/1966 | Pease | 219—98 X |

OTHER REFERENCES

Belke, R. E. et al.: General Electric "Transistor Manual," August 1964; pp. 320–323 relied on.

JOSEPH V. TRUHE, Primary Examiner

R. O'NEILL, Assistant Examiner

U.S. Cl. X.R.

219—95, 114